(12) United States Patent
Mollhagen et al.

(10) Patent No.: US 8,336,905 B1
(45) Date of Patent: Dec. 25, 2012

(54) TRAILER FOR TRANSPORTING A LIVESTOCK IMPLEMENT

(75) Inventors: Jon Davis Mollhagen, Lorraine, KS (US); Matthew Darrell Jundt, Ellsworth, KS (US)

(73) Assignee: Moly Manufacturing, Inc., Lorraine, KS (US)

( * ) Notice: Subject to any disclaimer, the term of this patent is extended or adjusted under 35 U.S.C. 154(b) by 288 days.

(21) Appl. No.: 12/874,365

(22) Filed: Sep. 2, 2010

Related U.S. Application Data

(60) Provisional application No. 61/275,982, filed on Sep. 3, 2009.

(51) Int. Cl.
*B62B 1/00* (2006.01)
*B60P 3/04* (2006.01)

(52) U.S. Cl. .................. 280/656; 280/657; 119/400

(58) Field of Classification Search .......... 280/656, 280/657; 119/400; 414/474, 481, 482, 483
See application file for complete search history.

(56) References Cited

U.S. PATENT DOCUMENTS

| | | | |
|---|---|---|---|
| 3,796,191 A * | 3/1974 | McIntire | 119/848 |
| 3,894,645 A | 7/1975 | Verschage | |
| 3,929,104 A * | 12/1975 | Corbin | 119/734 |
| 4,201,157 A * | 5/1980 | Lambert | 119/752 |
| 4,250,836 A * | 2/1981 | Smith | 119/512 |
| 4,303,258 A * | 12/1981 | Davis | 119/400 |
| 4,991,895 A * | 2/1991 | Artho | 280/43.14 |
| 5,810,544 A * | 9/1998 | Wellman | 414/495 |
| 5,890,453 A * | 4/1999 | Waring-Brown | 119/400 |
| 6,595,540 B1 | 7/2003 | MacKarvich | |
| 6,622,646 B1 | 9/2003 | Bennett et al. | |
| 6,698,812 B1 * | 3/2004 | Stubbs | 119/400 |
| 6,921,238 B2 * | 7/2005 | Bellis, Jr. | 414/345 |
| 7,213,539 B1 * | 5/2007 | Mollhagen | 119/843 |
| 7,216,605 B2 * | 5/2007 | Cupps | 119/400 |
| 7,544,033 B1 | 6/2009 | Mollhagen | |
| 7,677,205 B2 * | 3/2010 | Daniels | 119/843 |

* cited by examiner

*Primary Examiner* — J. Allen Shriver, II
*Assistant Examiner* — James M Dolak

(57) ABSTRACT

The trailer apparatus of the present invention includes a frame suitable for holding and supporting a livestock implement from a position above the livestock implement and a pair of actuated wheel assemblies which can extend from a retracted position to an extended position to support the livestock implement for transport. Each wheel assembly includes an arm which has a proximate end and a distal end. Each arm of each wheel assembly is pivotably mounted to one of the side members at the proximate of the arm. Each arm of each wheel assembly has a wheel rotatably mounted to the distal end of the arm. An actuator connects between each side member of the frame and the arm of each wheel assembly. The actuators are configured and controlled to extend and retract the wheel assemblies.

3 Claims, 4 Drawing Sheets

TRAILER FOR TRANSPORTING A LIVESTOCK IMPLEMENT

RELATED APPLICATION

This application claims the benefit of U.S. Provisional Application Ser. No. 61/275,982 having a filing date of Sep. 3, 2009, which is incorporated herein by reference.

FIELD OF THE INVENTION

The present invention relates to a trailer and more particularly to a trailer which is adapted for lifting and transporting a livestock implement.

BACKGROUND OF THE INVENTION

Those who work with cattle and other livestock often use livestock handling implements such as squeeze chutes for tasks such as vaccinations and the like. It is often necessary to transport such an implement to a location where livestock animals are present. As is the case with cattle squeeze chutes, a livestock implement can be a heavy, bulky apparatus. Accordingly, there is a need for an apparatus which can be used to lift, support and transport livestock implements.

SUMMARY OF THE INVENTION

The purpose of the present invention is to provide a trailer apparatus which can be used to lift, support and transport livestock implements. The trailer apparatus of the present invention includes a frame suitable for holding and supporting a livestock implement from a position above the livestock implement and a pair of actuated wheel assemblies that can extend to support the livestock implement for transport. The frame includes two generally parallel, horizontal side members which are spaced apart from each other. A wheel assembly is mounted to each of the two side members of the frame. Each wheel assembly includes an arm which has a proximate end and a distal end. Each arm of each wheel assembly is pivotably mounted to one of the side members at the proximate of the arm. Each arm of each wheel assembly has a wheel rotatably mounted to the distal end of the arm. An actuator connects between each side member of the frame and the arm of each wheel assembly. The actuators are configured and controlled to extend and retract in unison which causes the wheel assemblies to move in unison between a first retracted position and a second extended position. The first retracted position is characterized by proximity of each wheel of each wheel assembly to the frame side member. The second extended position is characterized by spaced separation of each wheel of each wheel assembly from the frame side member thereby allowing the frame to be supported in a raised position.

The lifting trailer can be used to engage, lift and transport livestock implements. If, for example, a squeeze chute for cattle, is attached to the frame by securing the top portion of the cattle chute to the frame when the frame is not completely elevated, the squeeze chute may be supported and transported by extending the wheel assemblies and pulling the frame in the same manner one would pull a trailer.

DETAILED DESCRIPTION

Figure 1:
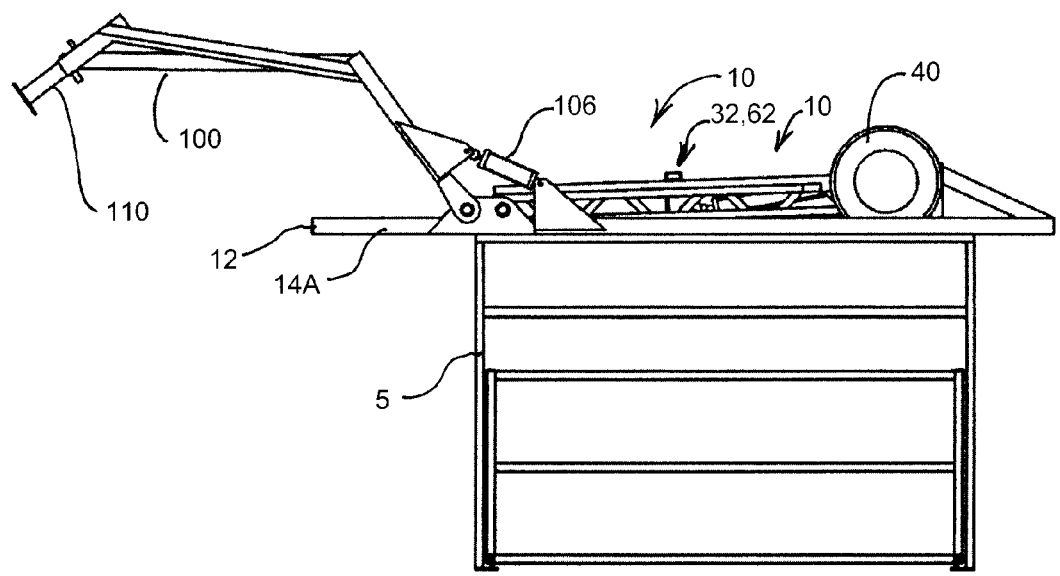
FIG. 1 is a side view of the trailer of the present invention with the wheel assemblies in the retracted position and the hitch assembly in the raised position.
Figure 5:
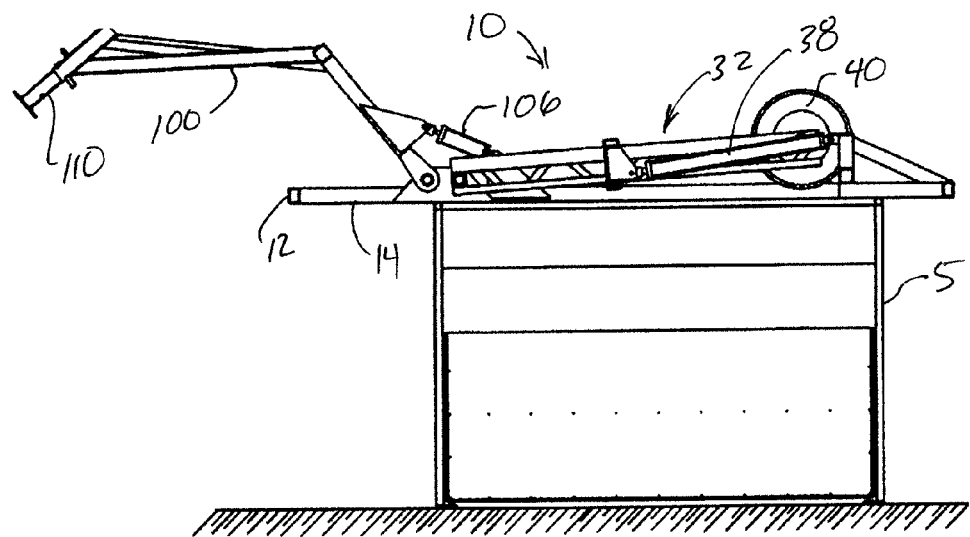
FIG. 5 is a section view taken from plane A-A of FIG. 3 showing a side view of the trailer of the present invention with the wheel assemblies in the retracted position and the hitch assembly in the raised position.
Figure 8:
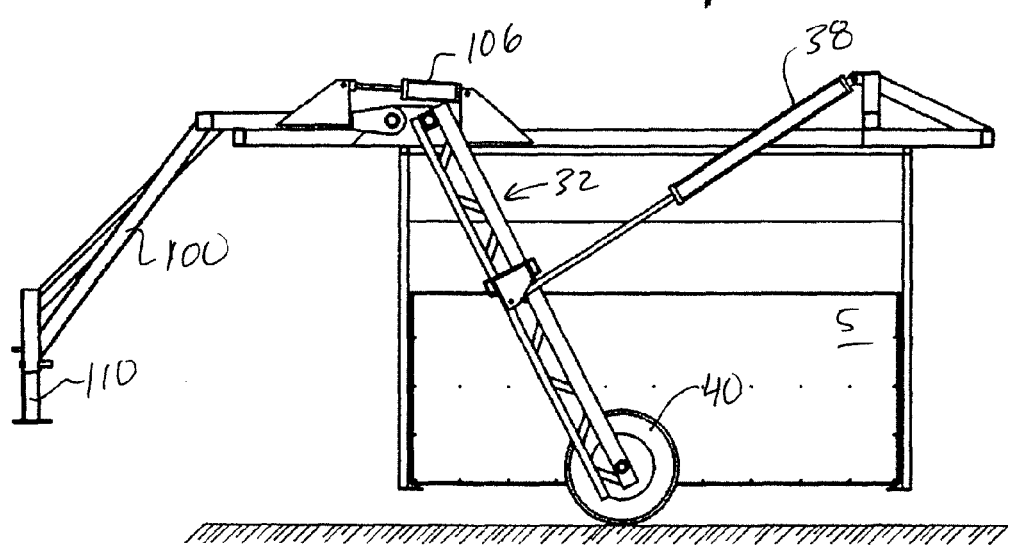
FIG. 8 is a section view taken from plane B-B of FIG. 4 showing a side view of the trailer of the present invention with the wheel assemblies in the extended position and the hitch assembly in the lowered position.

Turning now to the drawings, wherein like reference numerals identify identical or corresponding elements, and more particularly to FIG. 1 thereof, a trailer 10 having a frame, a hitch assembly and pivotably mounted wheel assemblies is shown. As can be seen in FIG. 1, the trailer apparatus 10 includes a frame 12 suitable for holding and supporting a livestock implement 5 from a position above livestock implement 5. Trailer 10 includes a pair of pivotably mounted wheel assemblies 32 and 62 which can be extended support livestock implement 5 for transport as shown in FIG. 8 or which can be retracted as shown in FIG. 5. Frame 12 includes two generally parallel, horizontal side members 14A and 14B which are spaced apart from each other and connected, in this example by at least two transverse end members 16A and 16B which complete a rigid rectangular frame. A hitch assembly 100 is pivotably mounted to the front of frame 12. In this example, hitch assembly 100 is actuated by a hydraulic cylinder 106 for pivoting hitch assembly 100 between a raised position as is shown in FIG. 1 and a lowered position as shown in FIG. 2.

Figure 2:
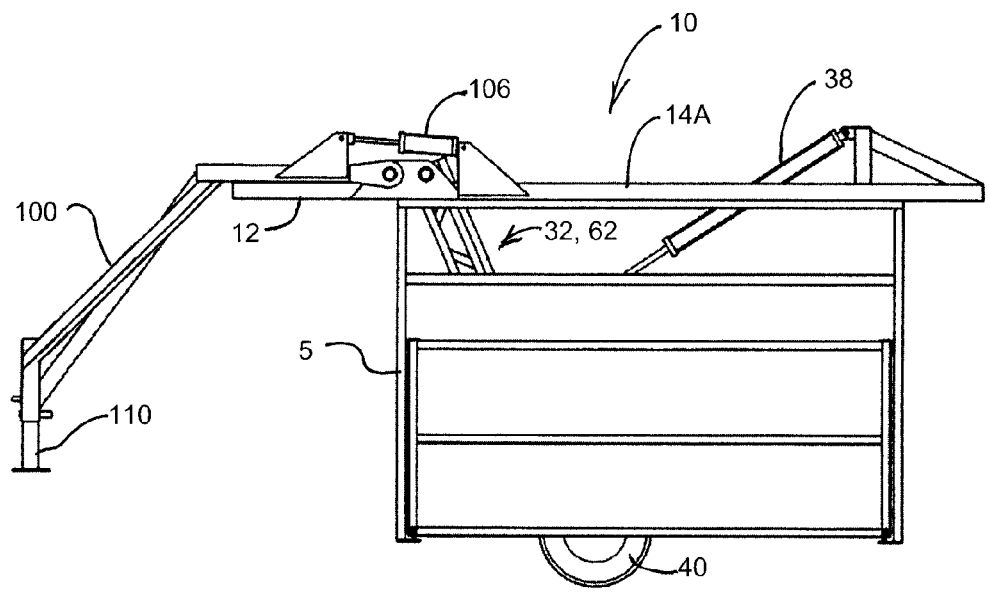
FIG. 2 is a side view of the trailer of the present invention with the wheel assemblies in the extended position and the hitch assembly in the lowered position.
Figure 3:
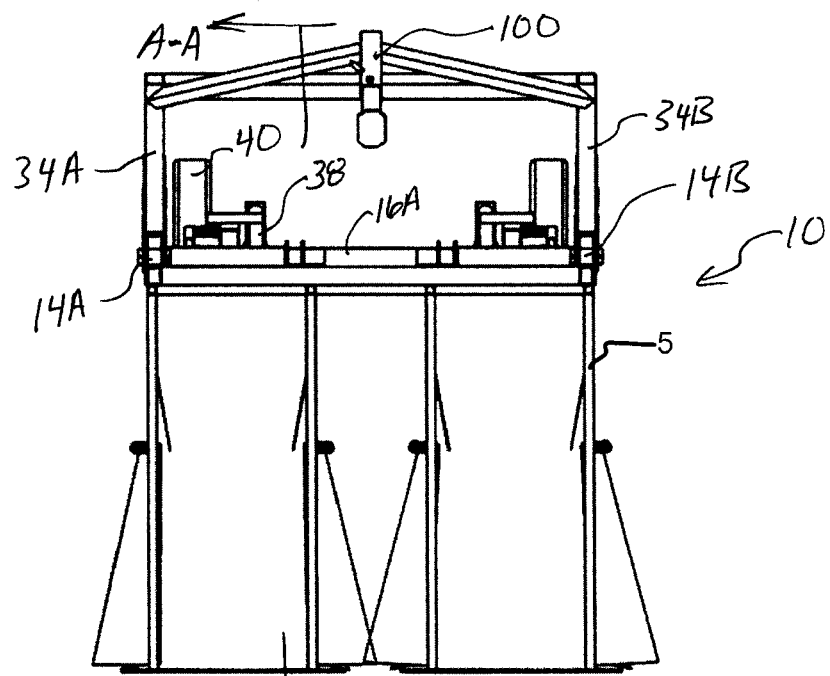
FIG. 3 is a front view of the trailer of the present invention with the wheel assemblies in the retracted position and the hitch assembly in the raised position.
Figure 4:
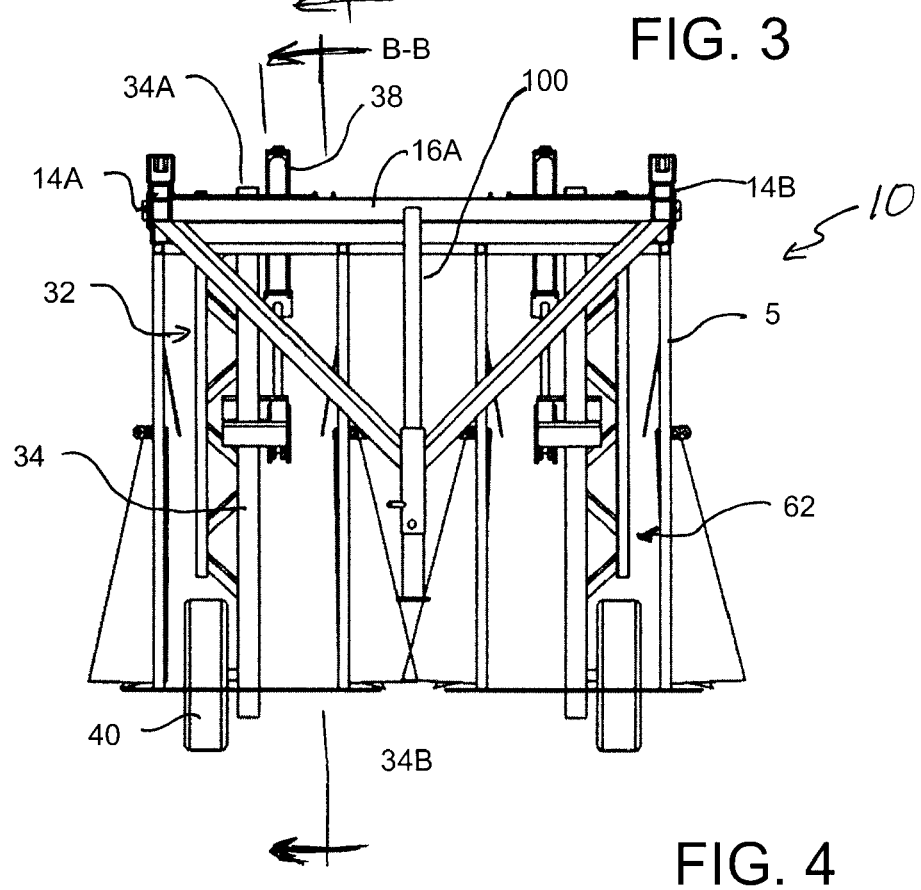
FIG. 4 is a front view of the trailer of the present invention with the wheel assemblies in the extended position and the hitch assembly in the lowered position.
Figure 6:
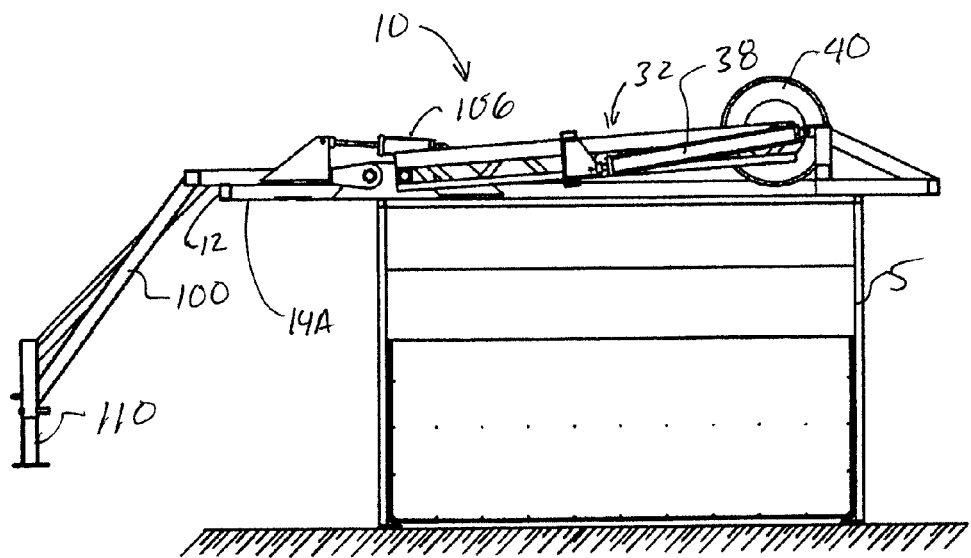
FIG. 6 is a section view showing a side view of the trailer of the present invention with the wheel assemblies in the retracted position and the hitch assembly in the lowered position.
Figure 7:
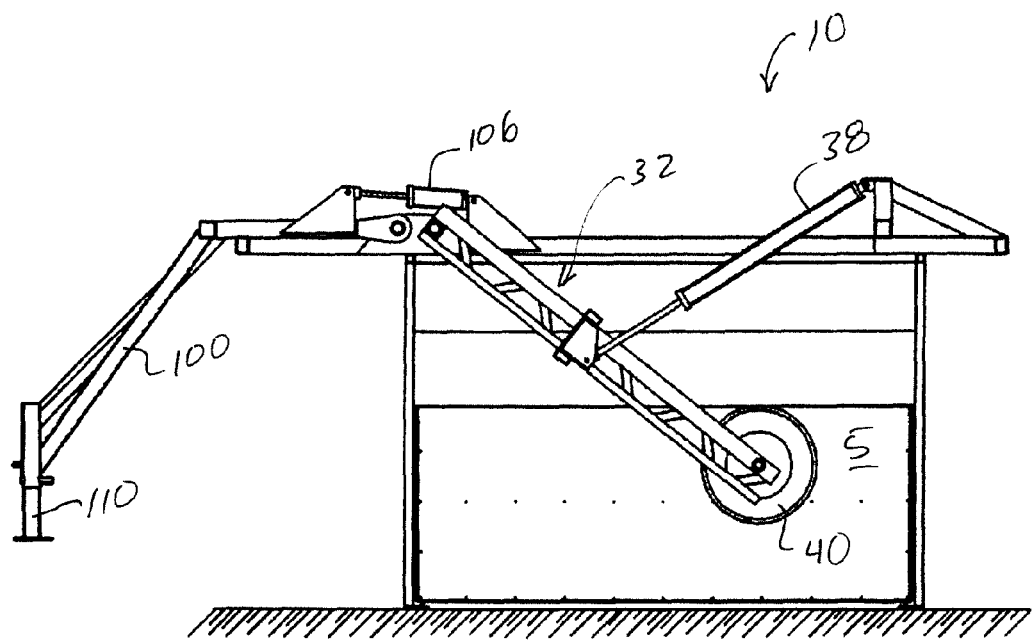
FIG. 7 is a section view showing a side view of the trailer of the present invention with the wheel assemblies in a partially extended position and the hitch assembly in the lowered position.

An important capability of trailer 10 is the ability of hitch assembly to move between a raised position as shown in FIG. 1 and a lowered position as shown in FIG. 2. The raised position shown in FIG. 1 is suitable for the passage of livestock. Wheel assemblies 32 and 62 are pivobatly mounted to each of the two side members 14A and 14B of frame 12 respectively. Because the wheel assemblies 32 and 62 are identical, only wheel assembly 32 will be considered in this detailed description. The reader should understand wheel assembly 62 has components and a configuration which is identical and symmetrical to wheel assembly 32. Wheel assembly 32 includes an arm 34 which has a proximate end 34A and a distal end 34B. Arm 34 is pivotably mounted side member 14A at proximate end 34A. Arm 34 carries a rotatably mounted wheel 40 at distal end 34B. An actuator, which in this example is hydraulic cylinder 38 connects between each side member 14A of frame 12 and arm 34 at a fixed location which is generally between proximate end 34A and distal end 34B. Hydraulic cylinder 38 is sized, located and controllable by means well known in the art to extend and retract in unison with an opposite hydraulic cylinder associated with wheel assembly 62 in order to cause both wheel assemblies to move in unison between a first retracted position as shown in FIGS. 5 and 6 and a second extended position which is shown in FIG. 8. As can be seen in FIGS. 1, 5 and 6, the first refracted position is characterized by proximity of wheel 40 to the frame side member 14A. The second extended position is characterized by spaced separation of wheel 40 from frame side member 14A thereby allowing frame 12 to be supported in a raised position as is best shown in FIG. 8.

Another important capability of trailer 10 is the ability to pivot hitch assembly 100 between a lowered position as shown in FIG. 2 and a raised position as is best shown in FIG. 1. The lowered position shown in FIG. 2 is suitable for attaching hitch coupler 110 to corresponding mount on a vehicle in order to pull and transport trailer 10 and livestock implement 5. The raised orientation of hitch assembly 100 shown in FIGS. 1 and 5 is suitable for permitting use of livestock implement 5 without the need to disconnect trailer 10 from livestock implement 5. Accordingly, livestock implement 5 may be transported to a livestock working site and used without having to disengage trailer 10 from livestock implement 5. This capability together with the capability of retracting the wheel assemblies as described above allows the operator to merely raise the hitch assembly and retract the wheel assemblies and then proceed with livestock working operations.

The lifting trailer can be used to engage, lift and transport livestock implements. If, for example, a squeeze chute for cattle, is attached to the frame by securing the top portion of the cattle chute to the frame when the frame is not completely elevated, the squeeze chute may be supported and transported by extending the wheel assemblies and pulling the frame in the same manner one would pull a trailer. It should be noted a squeeze chute is substantially narrower in width than the pair of livestock alleyways shown in the drawings. Accordingly, in the case of a squeeze chute, wheel assemblies 32 and 62 would straddle on the outside of the squeeze chute with sufficient clearance for wheel assemblies 32 and 62 to pivot between the retracted and extended positions as described above. The livestock alleyway apparatus 5 shown in the drawings is relatively wide and is configured so that wheel assemblies 32 and 62 can be pivoted down through the side by side alleyways.

Numerous modifications and variations of this preferred embodiment may occur to those skilled in the art in light of this disclosure. Accordingly, it is expressly to be understood that these modifications and variations, and equivalents thereof, shall be considered to be within the spirit and scope of the invention as defined and described herein.

Having thus described the invention, what is claimed as new and desired to be secured by Letters Patent is:

1. An improved trailer, comprising:
   (a) a frame including two generally parallel, generally horizontal spaced apart side members,
   (b) a wheel assembly mounted on each of the two side members of the frame, each wheel assembly including an arm having a proximate end and a distal end, each arm pivotably mounted to the side member at the proximate end of the arm and each arm having a wheel rotatably mounted to the distal end thereof,
   (c) an actuator connecting between each side member of the frame and the arm of each wheel assembly, the actuators adapted and controlled in order to extend and retract in unison in order to cause the wheel assemblies to move in unison between a first retracted position and a second extended position, the first retracted position characterized by proximity of each wheel of each wheel assembly to the frame side member, the second extended position characterized by spaced separation of each wheel of each wheel assembly from the frame side member thereby causing the frame to be supported in a raised position,
   (d) the frame having attachment means for clamping onto and holding a livestock implement, whereby the trailer may be extended into a fully extended position, rolled over a livestock implement, slightly retracted to come into proximity with the livestock implement for engaging the attachment means to the livestock implement and then fully extended in order to lift the livestock implement to a height above the ground sufficient for transporting the livestock implement with the trailer and whereby the trailer may be pulled to transport the livestock implement to a location and retracted to place the livestock implement on the ground prior to use of the livestock implement and further whereby the trailer may be pulled to transport the livestock implement to a location and retracted to place the livestock implement on the ground, disengaged from the livestock implement, raised and rolled away from the livestock implement prior to use of the livestock implement.

2. The trailer of claim 1, wherein;
   each wheel assembly is pivotably mounted to the frame at a location toward the forward end of the frame and each wheel assembly, extends toward the rear end of the frame when in the retracted position and wherein the actuator and the wheel assembly are arranged such that, when the wheel assemblies are extended for transport, the distance between the axles of the wheels and the center of gravity of the loaded trailer when projected on to a horizontal plane common to the axles of the wheels is less than one third the length of the trailer.

3. The trailer of claim 1 further comprising;
   a hitch assembly pivotably mounted at the forward end of the frame of the trailer and an actuator extending between the frame and the hitch assembly for moving the hitch assembly between a first lowered position suitable for trailering and a second raised position wherein a livestock implement mounted to the frame may be used without the hitch assembly obstructing livestock from entering and leaving the livestock implement.

* * * * *